United States Patent [19]
Mori et al.

[11] Patent Number: 5,635,787
[45] Date of Patent: Jun. 3, 1997

[54] DRIVING CIRCUIT FOR GYROSCOPE

[75] Inventors: Akira Mori; Takeshi Nakamura, both of Nagaokakyo, Japan

[73] Assignee: Murata Manufacturing Co., Ltd., Kyoto-fu, Japan

[21] Appl. No.: 568,438

[22] Filed: Dec. 6, 1995

Related U.S. Application Data

[63] Continuation of Ser. No. 351,734, Dec. 8, 1994, abandoned, which is a continuation of Ser. No. 110,777, Aug. 23, 1993, abandoned.

[30] Foreign Application Priority Data

Aug. 27, 1992 [JP] Japan .................. 4-253739

[51] Int. Cl.$^6$ .................................. H01L 41/08
[52] U.S. Cl. .............. 310/316; 73/504.12; 310/321
[58] Field of Search ........................ 310/314, 316, 310/317, 319, 321, 329; 73/517 R, 517 V, 505

[56] References Cited

U.S. PATENT DOCUMENTS 4,479,098  10/1984  Watson ................. 310/318 X
5,049,776   9/1991  Ogawa .................. 310/321 X
5,220,833   6/1993  Nakamura ................... 73/505
5,270,607  12/1993  Terajima ................... 310/316
5,349,857   9/1994  Kasanami et al. ........ 310/316 X Primary Examiner—Mark O. Budd
Attorney, Agent, or Firm—Nikaido Marmelstein Murray & Oram LLP

[57] ABSTRACT

A driving circuit (30) includes an oscillation circuit (32). An input terminal of the oscillation circuit (32) is connected to a feedback piezoelectric element (16a) of a vibratory gyroscope (10). The oscillation circuit (32) is designed to amplify a feedback signal from the feedback piezoelectric element (16a). An output terminal of the oscillation circuit (32) is connected to a first input terminal of an AGC circuit (42), via a phase-shifting circuit (36) for adjusting a phase. The feedback piezoelectric element (16a) is connected to a second input terminal of the AGC circuit (42). An output terminal of the AGC circuit (42) is connected to driving and detecting piezoelectric elements (16b) and (16c). The AGC circuit (42). is designed to suppress the voltage of the driving signal to the driving and detecting piezoelectric elements (16b) and (16c), in response to the voltage of the feedback signal from the feedback piezoelectric element (16a).

12 Claims, 6 Drawing Sheets

F I G. 2
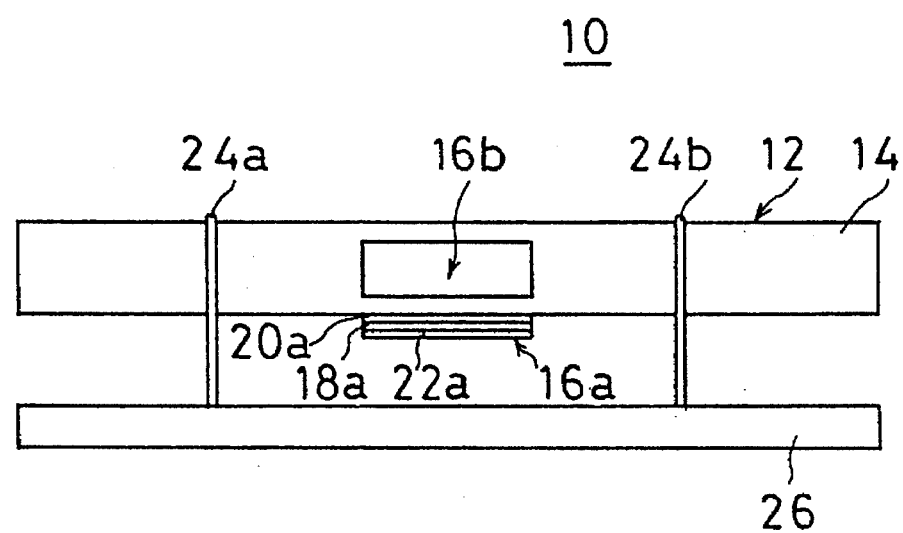

F I G. 6
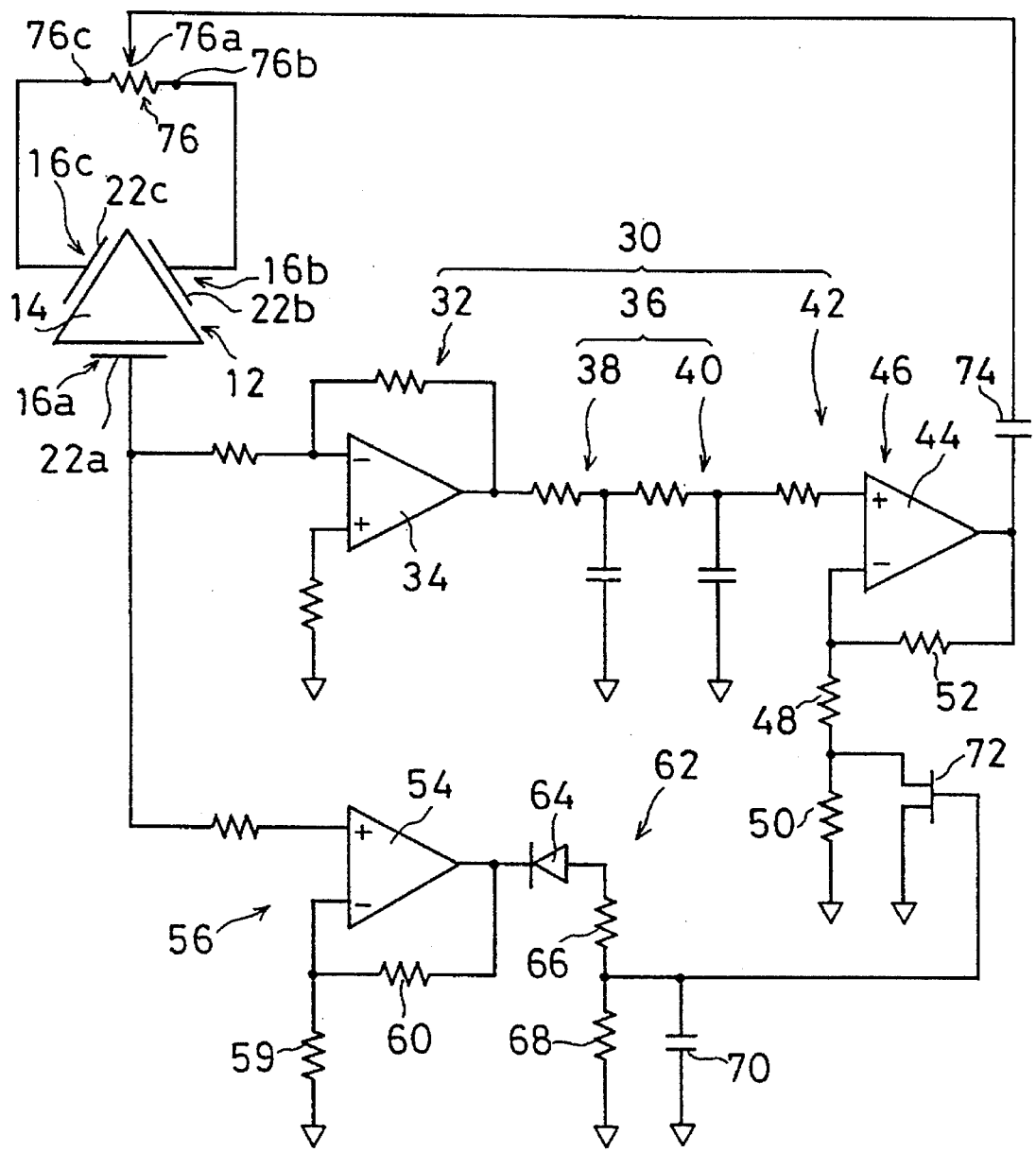

DRIVING CIRCUIT FOR GYROSCOPE

This application is a continuation of application Ser. No. 08/351,734 filed Dec. 8, 1994, now abandoned, which is a continuation of application Ser. No. 08/110,777 filed Aug. 23, 1993 now abandoned.

BACKGROUND OF THE INVENTION

1. Field of the Invention

The present invention relates to a driving circuit for a gyroscope, and particularly to a driving circuit for a gyroscope which generates a driving signal of the gyroscope by a feedback signal of the gyroscope such as a vibratory gyroscope capable of detecting a rotational angular velocity.

2. Description of the Prior Art

FIG. 7 is a block diagram showing an example of a conventional vibratory gyroscope which is a background of the present invention. The vibratory gyroscope 1 comprises a vibrator 2 which includes, for example, a triangular prism-shaped vibrating body 3. On three side faces of the vibrating body 3, piezoelectric elements 4a, 4b and 4c are formed respectively. One piezoelectric element 4a is used for feedback, and the other two piezoelectric elements 4b and 4c are used for driving and detecting.

Between the feedback piezoelectric element 4a and the two driving and detecting piezoelectric elements 4b and 4c, a driving circuit 7 consisting of an oscillation circuit 5 and a phase-shifting circuit 6 is connected.

Also, to the driving and detecting piezoelectric elements 4b and 4c, a detecting circuit 8 consisting of a differential amplifier and so on is connected.

In the vibratory gyroscope 1, the driving circuit 7 gives, by the feedback signal from one feedback piezoelectric element 4a of the vibrator 2, a constant voltage driving signal to the two driving and detecting piezoelectric elements 4b and 4c to vibrate the vibrating body 3.

When the vibrator 2 is rotated in such a state where the vibrating body 3 is vibrated, the output difference responsive to the rotational angular velocity is produced between the two driving and detecting piezoelectric elements 4b and 4c. A signal responsive to the output difference is output from the detecting circuit 8, and the rotational angular velocity is detected by the output signal.

However, in the vibratory gyroscope shown in FIG. 7, since the vibrator is driven by the driving signal which is constant voltage, when an output transformation efficiency of the vibrator (piezoelectric element), a capacity of the piezoelectric element, Q of the vibrator and so on change by the temperature change and changes with the lapse of time, sensitivity of the gyroscope (detecting circuit) fluctuates and the rotational angular velocity can not be detected accurately.

SUMMARY OF THE INVENTION

It is, therefore, a primary object of the present invention to provide a driving circuit for a gyroscope capable of preventing fluctuation in sensitivity of the gyroscope.

The present invention is directed to the driving circuit for a gyroscope which generates a driving signal of the gyroscope by a feedback signal of the gyroscope, wherein an AGC circuit for controlling the voltage of the driving signal of the gyroscope in response to the voltage of the feedback signal of the gyroscope is provided.

The driving circuit for the gyroscope generates the driving signal of the gyroscope by the feedback signal of the gyroscope. In this case, the AGC circuit of the driving circuit controls the voltage of the driving signal of the gyroscope in response to the voltage of the feedback signal of the gyroscope. Fluctuation in sensitivity of the gyroscope shows itself as fluctuation in the voltage of the feedback signal of the gyroscope. Hence, the fluctuation in sensitivity of the gyroscope can be prevented by the driving circuit.

According to the present invention, the driving circuit for the gyroscope capable of preventing the fluctuation in sensitivity of the gyroscope can be obtained.

The above and other objects, features, aspects and advantages of the present invention will become more apparent from the following detailed description of the embodiments with reference to the accompanying drawings.

BRIEF DESCRIPTION OF THE DRAWINGS

FIG. 2 is a side view showing a vibrator and its peripheral portion of the vibratory gyroscope shown in FIG. 1.

FIG. 6 is a circuit diagram showing a modified example of the driving circuit shown in FIG. 3.

DESCRIPTION OF THE PREFERRED EMBODIMENTS

Figure 1:
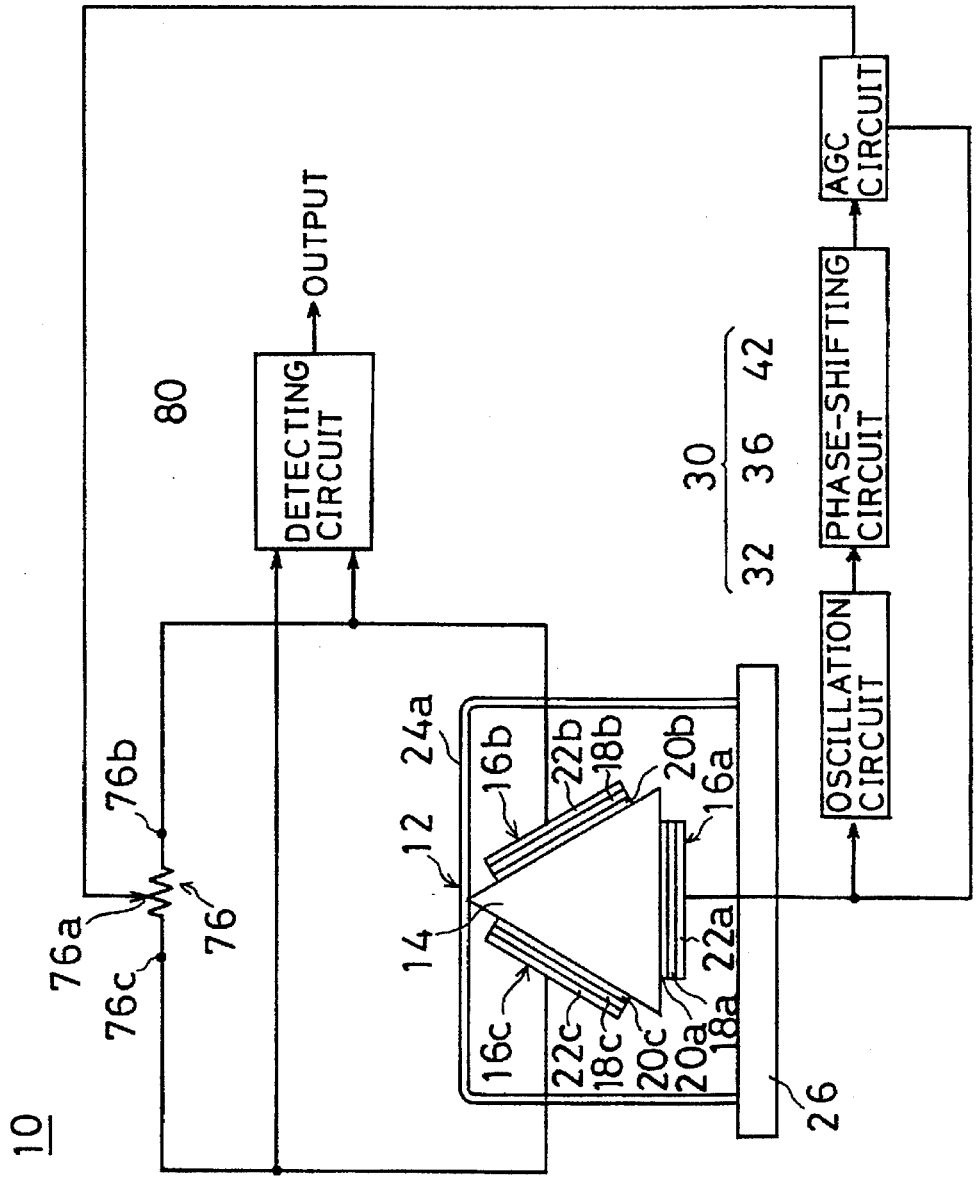
FIG. 1 is a block diagram showing an example of a vibratory gyroscope as one embodiment of the present invention.

FIG. 1 is a block diagram showing an example of a vibratory gyroscope as one embodiment of the present invention. FIG. 2 is a side view showing a vibrator and its peripheral portion of the vibratory gyroscope shown in FIG. 1. Though the present invention relates to a driving circuit for gyroscope, in the embodiment, one example of the vibratory gyroscope using the same is described.

The vibratory gyroscope 10 comprises a vibrator 12 as an angular velocity sensor, and the vibrator 12 includes, for example, a regular triangular prism-shaped vibrating body 14. The vibrating body 14 is formed with a material which generally generates a mechanical vibration such as elinver, iron-nickel alloy, quartz, glass, crystal, ceramics and the like.

On the vibrating body 14, piezoelectric elements 16a, 16b and 16c are formed respectively at the centers of its three side faces. The piezoelectric element 16a includes a piezoelectric layer 18a consisting of, for example, ceramics, and on both surfaces of the piezoelectric layer 18a, electrodes 20a and 22a are formed respectively. The electrodes 20a and 22a are formed with an electrode material such as gold, silver, aluminum, nickel, copper-nickel alloy (Monel Metal) and the like, and by means of thin-film forming techniques such as sputtering and vacuum evaporation or by means of printing techniques depending on the material. Similarly, the other piezoelectric elements 16b and 16c respectively include piezoelectric layers 18b and 18c consisting of, for example, ceramics, and on both surfaces of the piezoelectric layers 18b and 18c, electrodes 20b, 22b and 20c, 22c are formed respectively. The electrodes 20a–20c of the piezoelectric elements 16a–16c are bonded to the vibrating body 14 by means of, for example, an adhesive.

The vicinities of two nodal points of the vibrating body 14 are respectively supported by U-shaped supporting members 24a and 24b consisting of, for example, a metal wire. Center portions of the supporting members 24a and 24b are respectively secured to the vicinities of the two nodal points of the vibrating body 14, by welding or by bonding with a conductive paste. End portions of the supporting members 24a and 24b are secured to one surface of a supporting plate 26.

In the vibrator 12, for example, one piezoelectric element 16a is used for feedback and the other two piezoelectric elements 16b and 16c are used for driving and detecting. When a feedback signal from the feedback piezoelectric element 16a is amplified and applied as a driving signal to the driving and detecting piezoelectric elements 16b and 16c, the vibrating body 14 vibrates and the same wave forms are output from the piezoelectric elements 16b and 16c. When the vibrator 12 is rotated about its axis in that state, an output of one driving and detecting piezoelectric element becomes larger according to the rotational angular velocity, and conversely, an output of the other driving and detecting piezoelectric element becomes smaller according to the rotational angular velocity. Output transformation efficiencies of the piezoelectric elements 16a–16c of the vibrator 12 become larger respectively as the temperature rises.

Between the electrode 22a of the feedback piezoelectric element 16a and the electrodes 22b and 22c of the driving and detecting piezoelectric elements 16b and 16c, a driving circuit 30 for self-excitation driving the vibrator 12 is connected.

Figure 3:
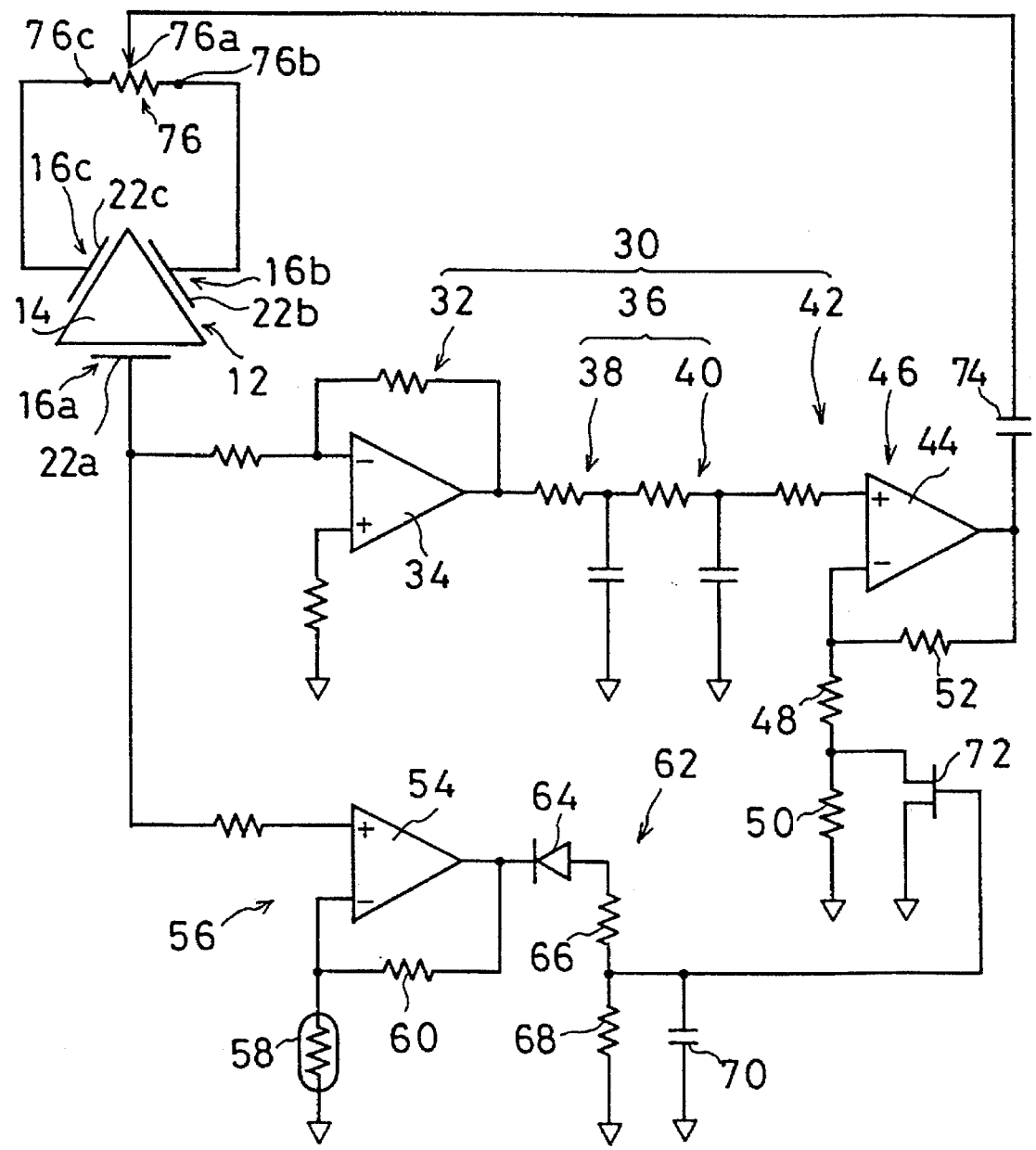
FIG. 3 is a circuit diagram showing a driving circuit of the vibratory gyroscope shown in FIG. 1.

The driving circuit 30 includes an oscillation circuit 32. As shown in FIG. 3, the oscillation circuit 32 is constituted by, for example, an inverting amplifier consisting of an operational amplifier 34 and so on. The electrode 22a of the feedback piezoelectric element 16a is connected to an input terminal of the oscillation circuit 32. The oscillation circuit 32 is designed to invert a phase of the feedback signal from the feedback piezoelectric element 16a and to amplify the feedback signal.

As shown in FIG. 1, an input terminal of a phase-shifting circuit 36 is connected to an output terminal of the oscillation circuit 32. As shown in FIG. 3, the phase-shifting circuit 36 includes two-stage RC filters 38 and 40, which respectively have, for example, a delay angle of 45 degree. The phase-shifting circuit 36 is designed to delay the output phase from the oscillation circuit 32 by 90 degree and to suppress higher harmonic components included in the output.

As shown in FIG. 1, a first input terminal of an AGC circuit 42 is connected to an output terminal of the phase-shifting circuit 36. The AGC circuit 42 is designed to control the driving signal voltage in response to the voltage of the feedback signal.

As shown in FIG. 3, the AGC circuit 42 includes, for example, a first non-inverting amplifier 46 consisting of an operational amplifier 44 and so on, and the output terminal of the phase-shifting circuit 36 is connected to a non-inverting input side of the first non-inverting amplifier 46. The first non-inverting amplifier 46 is designed to amplify an output of the phase-shifting circuit 36. An inverting input terminal of the operational amplifier 44 of the first non-inverting amplifier 46 is connected to an intermediate point of the power supply voltage via two resistances 48 and 50. Between the inverting input terminal and the output terminal of the operational amplifier 44, a resistance 52 is connected.

Furthermore, as shown in FIG. 1, the electrode 22a of the feedback piezoelectric element 16a is connected to a second input terminal of the AGC circuit 42. That is, as shown in FIG. 3, the AGC circuit 42 includes, for example, a second non-inverting amplifier 56 consisting of an operational amplifier 54 and so on, and the electrode 22a of the feedback piezoelectric element 16a is connected to a non-inverting input side of the second non-inverting amplifier 56. The second non-inverting amplifier 56 is designed to amplify the feedback signal from the feedback piezoelectric element 16a. An inverting input terminal of the operational amplifier 54 of the second non-inverting amplifier 56 is connected to the intermediate point of the power supply voltage, via a negative temperature coefficient thermistor 58 as a temperature sensing element. A resistance 60 is connected between the inverting input terminal and an output terminal of the operational amplifier 54. The negative temperature coefficient thermistor 58 is designed to compensate temperature of the second non-inverting amplifier 56, or the AGC circuit 42. That is, an amplification of the second non-inverting amplifier 56 increases as the temperature rises.

A half-wave rectification smoothing circuit 62 is connected to an output terminal of the second non-inverting amplifier 56. The half-wave rectification smoothing circuit 62 is for half-wave rectifying and smoothing the output of the second non-inverting amplifier 56. The half-wave rectification smoothing circuit 62 includes a diode 64. A cathode of the diode 64 is connected to the output terminal of the second non-inverting amplifier 56. An anode of the diode 64 is connected to the intermediate point of the power supply voltage via two resistances 66 and 68. The two resistances 66 and 68 are designed to divide an anode potential of the diode 64. A connection of the two resistances 66 and 68 is connected to the intermediate point of the power supply voltage via a capacitor 70. The capacitor 70 is designed to smooth a potential of the connection between the two resistances 66 and 68. The potential reduces as the voltage of the feedback signal from the feedback piezoelectric element 16a increases, and increases as the voltage of the feedback signal reduces.

A gate of an n-channel FET 72 is connected to an output terminal of the half-wave rectification smoothing circuit 62. A drain and a source of the FET 72 are connected respectively to both ends of the resistance 50 of the first non-inverting amplifier 46. The FET 72 is designed to adjust resistance between the inverting input terminal of the operational amplifier 44 of the first non-inverting amplifier 46 and the intermediate point of the power supply voltage, and to adjust amplification of the first non-inverting amplifier 46 in response to the gate potential. That is, when the gate potential of the FET 72 reduces, the resistance between the inverting input terminal of the operational amplifier 44 of the first non-inverting amplifier 46 and the intermediate point of the power supply voltage increases, and the amplification of the first non-inverting amplifier 46 reduces. Conversely, when the gate potential of the FET 72 increases, the resistance between the inverting input terminal of the operational amplifier 44 and the intermediate point of the power supply voltage reduces, and the amplification of the first non-inverting amplifier 46 increases.

Meanwhile, the output terminal of the first non-inverting amplifier 46 of the AGC circuit 42 is connected to a movable terminal 76a of a variable resistor 76 via a capacitor 74, and two fixed terminals 76b and 76c of the variable resistor 76 are connected respectively to the electrodes 22b and 22c of the driving and detecting piezoelectric elements 16b and 16c.

As shown in FIG. 1, the electrodes 22b and 22c of the driving and detecting piezoelectric elements 16b and 16c are connected respectively to two input terminals of a detecting circuit 80 consisting of, for example, a differential amplifier and so on. The detecting circuit 80 is designed to detect the output difference between the driving and detecting piezoelectric elements 16b and 16c to detect a rotational angular velocity.

Next, the operation of the vibratory gyroscope 10 is described.

In the vibratory gyroscope 10, by a feedback signal from the feedback piezoelectric element 16a of the vibrator 12, the driving circuit 30 gives a driving signal to the two driving and detecting piezoelectric elements 16b and 16c to vibrate the vibrating body 14. Thus, the vibratory gyroscope 10 is subjected to self-excitation drive.

When the vibrator 12 is rotated in such an vibrating state of the vibrating body 14, the output difference responsive to the rotational angular velocity is produced between the two driving and detecting piezoelectric elements 16b and 16c. A signal responsive to the output difference is output from the detecting circuit 80, and the rotational angular velocity is detected by the output signal.

Hereupon, the case where a capacity of the piezoelectric element, Q of the vibrator and so on change by changes with the lapse of time and so on is described.

In this case, the output generated in the two driving and detecting piezoelectric elements 16b and 16c tends to fluctuate. When the output fluctuates as such, the output of the detecting circuit 80 also fluctuates and the rotational angular velocity can not be detected accurately.

However, in the vibratory gyroscope 10, in response to the voltage of the feedback signal from the feedback piezoelectric element 16a, the AGC circuit 42 of the driving circuit 30 controls the voltage of the driving signal to the driving and detecting piezoelectric elements 16b and 16c. That is, when the voltage of the feedback signal increases, the output potential of the half-wave rectification smoothing circuit 62 reduces, and the resistance between the drain and the source of the FET 72 increases. Hence, an amplification of the first non-inverting amplifier 40 reduces and the voltage of the driving signal decreases. That is, the driving circuit 30 reduces the voltage of the driving signal, when the voltage of the feedback signal increases. Conversely, the driving circuit 30 increases the voltage of the driving signal when the voltage of the feedback signal reduces.

While, output fluctuations produced in the two driving and detecting piezoelectric elements 16b and 16c show itself as voltage fluctuation of the feedback signal from the feedback piezoelectric element 16a.

Hence, in the vibratory gyroscope 10, the output fluctuations produced in the two driving and detecting piezoelectric elements 16a and 16c is suppressed, and the output fluctuations of the detecting circuit 80 is also suppressed. Thus, in the vibratory gyroscope 10, the rotational angular velocity can be detected accurately.

Figure 4:
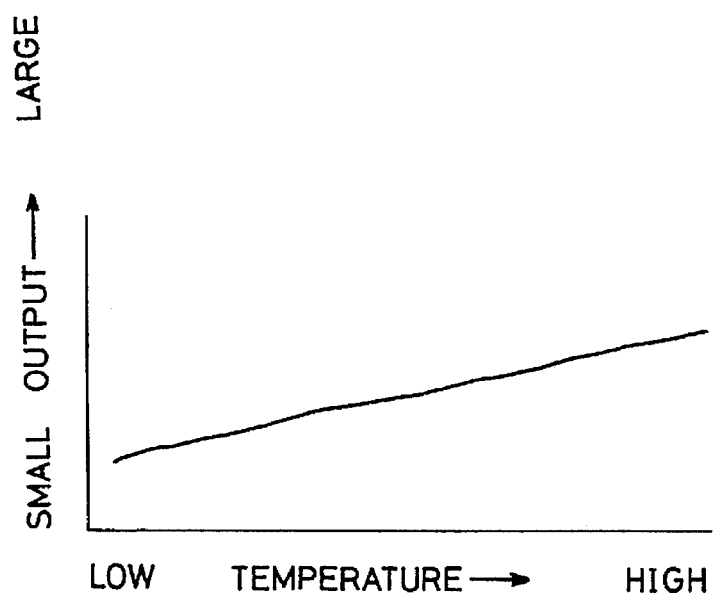
FIG. 4 is a graph showing an output against the temperature change of a piezoelectric element of the vibratory gyroscope shown in FIG. 1.

Meanwhile, in the vibratory gyroscope 10, since the output transformation efficiency of the piezoelectric elements 16a–16c increases as the temperature rises, the outputs of the piezoelectric elements 16a–16c also increase as shown in FIG. 4.

However, the driving circuit 30 of the vibratory gyroscope 10 reduces the voltage of the driving signal as the temperature rises. That is, the amplification of the second non-inverting amplifier 56 increases and the output potential of the rectification smoothing circuit 62 reduces as the temperature rises. And hence, as the temperature rises, the resistance between the drain and the source of the FET 72 increases, the amplification of the first non-inverting amplifier 46 reduces and the voltage of the driving signal decreases.

Figure 5:
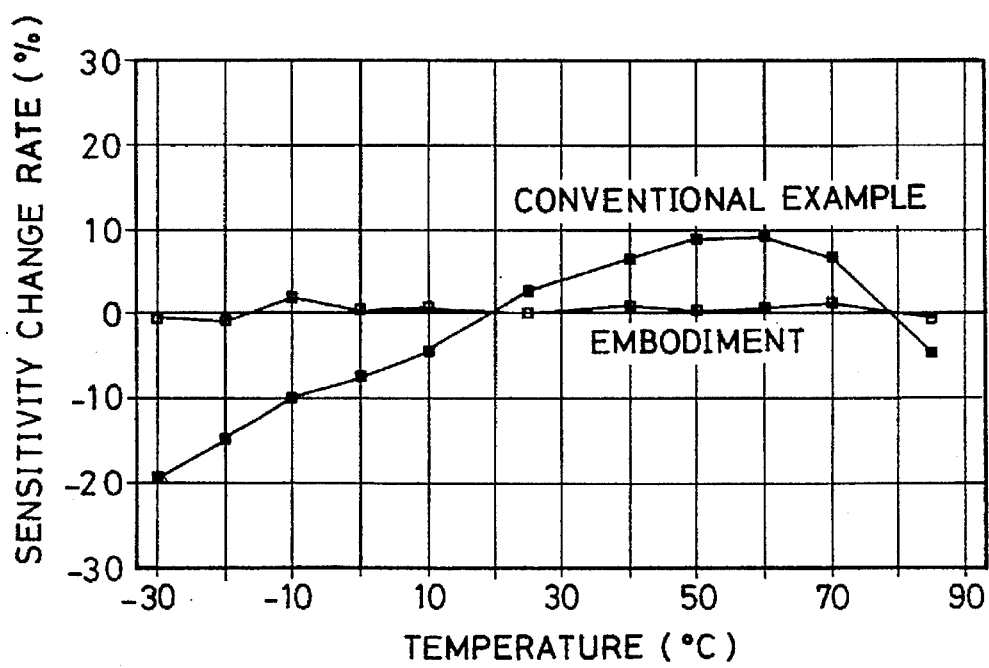
FIG. 5 is a graph showing the rate of sensitivity change against the temperature change of the embodiment shown in FIG. 1 and a conventional example shown in FIG. 7.
Figure 7:
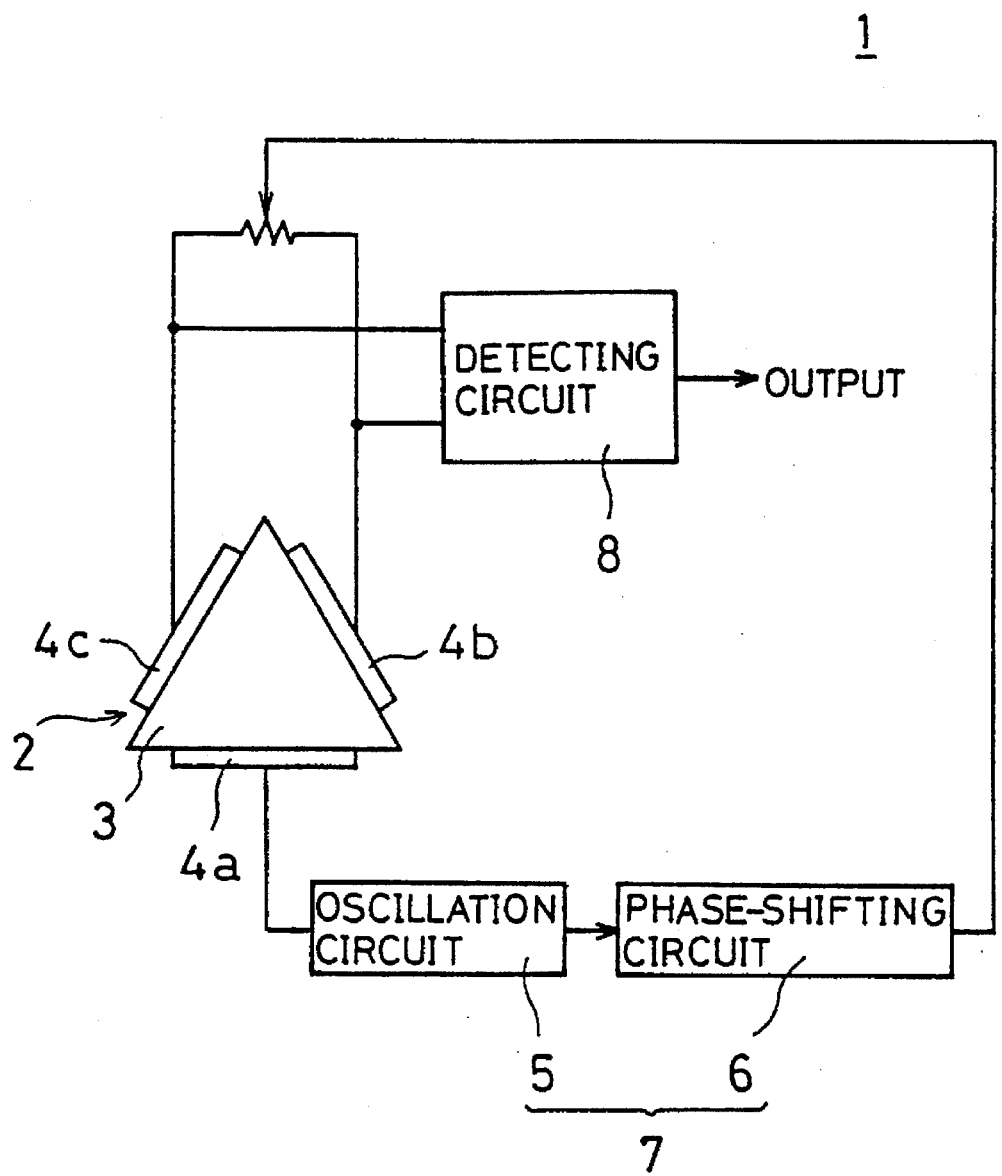
FIG. 7 is a block diagram showing an example of a conventional vibratory gyroscope which is a background of the present invention.

Thus, in the vibratory gyroscope 10, even when the temperature change, output fluctuations of the piezoelectric elements 16a–16c is suppressed, and as the rate of the sensitivity change against the temperature change shown in FIG. 5, the rotational angular velocity can be detected accurately. In FIG. 5, the rate of the sensitivity change against the temperature change of the conventional vibratory gyroscope shown in FIG. 7 is also shown.

In the above-mentioned embodiment, in order to reduce the voltage of the driving signal as the temperature rises, the negative temperature coefficient thermistor 58 may be replaced with the resistance, and the resistance 48, 60 or 68 may be replaced with a positive temperature coefficient thermistor as a temperature sensing element. The negative temperature coefficient thermistor 58 may be replaced with the resistance, and the resistance 52 or 66 may be replaced with the negative temperature coefficient thermistor as the temperature sensing element. The negative temperature coefficient thermistor 58 may be replaced with the resistance, and a positive temperature coefficient thermistor may be connected between the capacitor 74 and the variable resistor 76 as the temperature sensing element.

In the above-mentioned embodiment, though the piezoelectric element whose output transformation efficiency increases as the temperature rises, is used, the piezoelectric element whose output transformation efficiency reduces as the temperature rises, may be used. In this case, when the positive temperature coefficient thermistor is used in place of the negative temperature coefficient thermistor or the negative temperature coefficient thermistor is used in place of the positive temperature coefficient thermistor, even when the temperature changes, output fluctuations of the piezoelectric element is suppressed, and the rotational angular velocity can be detected accurately.

FIG. 6 is a circuit diagram showing a modified example of the driving circuit shown in FIG. 3. In the driving circuit shown in FIG. 6, as compared with the driving circuit shown in FIG. 3, particularly, between the inverting input terminal of the operational amplifier 54 of the second non-inverting amplifier 56 of the AGC circuit 42 and the intermediate point of the power supply voltage, a resistance 59 is connected in place of the temperature sensing element. That is, the driving circuit shown in FIG. 6 is most preferable for the case using the piezoelectric element whose output transformation efficiency is constant irrespective of the temperature change.

Though the AGC circuit is disposed in the later stage of the phase-shifting circuit in the above-mentioned embodiment, the AGC circuit may be disposed in the first stage of the phase-shifting circuit or in the first stage of the oscillation circuit.

It will be apparent from the foregoing that, while the present invention has been described in detail and illustrated, these are only particular illustrations and examples, and the present invention is not limited to these. The spirit and scope of the present invention is limited only by the appended claims.

What is claimed is:

1. A driving circuit for a gyroscope which generates a driving signal of said gyroscope by a feedback signal of said gyroscope, comprising:

an automatic gain control circuit for controlling a voltage of the driving signal of said gyroscope in response to a voltage of the feedback signal of said gyroscope, wherein said automatic gain control circuit includes a first amplifier for amplifying the feedback signal of said gyroscope, and an amplifying adjusting means for adjusting an amplification of said first amplifier in response to the voltage of the feedback signal of said gyroscope, and said amplifying adjusting means reduces the amplification of said first amplifier when the voltage of the feedback signal of said gyroscope is large, and increases the amplification of said first amplifier when the voltage of the feedback signal of said gyroscope is small, and wherein said first amplifier includes a first non-inverting amplifier having an operational amplifier, and said amplification adjusting means includes a resistance value adjusting means for adjusting a resistance value between an inverting input terminal of said operational amplifier and an intermediate point of a power supply voltage, in response to the voltage of the feedback signal of said gyroscope, and said resistance value adjusting means increases said resistance value when the voltage of the feedback signal of said gyroscope is large, and reduces said resistance value when the voltage of the feedback signal of said gyroscope is small, and wherein said resistance value adjusting means includes an FET whose drain and source are connected respectively to both ends of a resistance connected between said inverting input terminal of said operational amplifier and said intermediate point of said power supply voltage, and a gate potential adjusting means for adjusting a gate potential of said FET, in response to the voltage of the driving signal of said gyroscope.

2. A driving circuit for a gyroscope in accordance with claim 1 wherein said FET includes an n-channel FET, and said gate potential adjusting means reduces the gate potential of said FET when the voltage of the feedback signal of said gyroscope is large, and increases the gate potential of said FET when the voltage of the feedback signal of said gyroscope is small.

3. A driving circuit for a gyroscope in accordance with claim 2, wherein said gate potential adjusting means includes a second amplifier for amplifying the feedback signal of said gyroscope, a diode whose cathode is connected to an output terminal of said second amplifier, and two resistances connected in series between an anode of said diode and said intermediate point of said power supply voltage, and a connection of said two resistances is connected to the gate of said FET.

4. A driving circuit for a gyroscope in accordance with claim 1, which further comprises a temperature compensation means for compensating temperature of said automatic gain control circuit.

5. A driving circuit for a gyroscope in accordance with claim 4, wherein said temperature compensation means includes a temperature sensing element.

6. A driving circuit for a gyroscope in accordance with claim 5, wherein said temperature sensing element includes a thermistor.

7. A driving circuit for a gyroscope in accordance with claim 2, which further comprises a temperature compensation means for compensating temperature of said automatic gain control circuit.

8. A driving circuit for a gyroscope in accordance with claim 7, wherein said temperature compensation means includes a temperature sensing element.

9. A driving circuit for a gyroscope in accordance with claim 8, wherein said temperature sensing element includes a thermistor.

10. A driving circuit for a gyroscope in accordance with claim 3, which further comprises a temperature compensation means for compensating temperature of said automatic gain control circuit.

11. A driving circuit for a gyroscope in accordance with claim 10, wherein said temperature compensation means includes a temperature sensing element.

12. A driving circuit for a gyroscope in accordance with claim 11, wherein said temperature sensing element includes a thermistor.

* * * * *